United States Patent [19]

Noky

[11] Patent Number: 5,498,288
[45] Date of Patent: Mar. 12, 1996

[54] APPARATUS FOR PRODUCING A FILTER IN THE FORM OF A MONOLITHIC HONEYCOMB BODY

[75] Inventor: Werner Noky, Mainz-Gonsenheim, Germany

[73] Assignee: Schott Glaswerke, Mainz, Germany

[21] Appl. No.: 214,515

[22] Filed: Mar. 18, 1994

Related U.S. Application Data

[62] Division of Ser. No. 46,865, Apr. 8, 1993, Pat. No. 5,364,573.

[30] Foreign Application Priority Data

Apr. 8, 1992 [DE] Germany ............... 42 11 787.9

[51] Int. Cl.⁶ .................................. B05B 13/02
[52] U.S. Cl. ............... 118/305; 118/503; 118/669; 118/679; 55/523; 55/DIG. 5; 264/40.1
[58] Field of Search .................... 118/669, 305, 118/503, 500, 679, 671, 712; 55/523, DIG. 5; 425/461, 462, 127, 129.1; 264/40.1, 40, 60, 251, 264, 267, 273, 275; 156/64, 89, 253, 278, 310, 353; 428/116, 117, 188; 29/163.8, 720, 721, 527.1, 530, 407

[56] References Cited

U.S. PATENT DOCUMENTS

| | | | |
|---|---|---|---|
| 4,293,357 | 10/1981 | Higuchi et al. | 55/523 |
| 4,329,162 | 5/1982 | Pitcher, Jr. | 55/523 |
| 4,411,856 | 10/1983 | Montierth | 264/267 |
| 4,427,728 | 1/1984 | Belmonte et al. | 428/117 |
| 4,432,918 | 2/1984 | Paisley | 264/251 |
| 4,557,773 | 12/1985 | Bonzo | 156/64 |
| 4,557,962 | 12/1985 | Belmonte et al. | 428/117 |
| 4,563,414 | 1/1986 | Ogawa et al. | 430/325 |
| 4,576,774 | 3/1986 | Hazard et al. | 264/267 |
| 4,759,892 | 7/1988 | Bonzo | 264/251 |
| 5,021,204 | 6/1991 | Frost et al. | 264/60 |
| 5,086,556 | 2/1992 | Toi | 29/720 |
| 5,177,864 | 1/1993 | Oyama | 29/720 |

FOREIGN PATENT DOCUMENTS

| | | |
|---|---|---|
| 0042302B1 | 6/1981 | European Pat. Off. |
| 0070202 | 1/1983 | European Pat. Off. |
| 0564967A1 | 3/1993 | European Pat. Off. |

*Primary Examiner*—Robert J. Warden
*Assistant Examiner*—Hien Tran
*Attorney, Agent, or Firm*—Millen, White, Zelano & Branigan

[57] ABSTRACT

A process and apparatus are described for the production of a filter in the form of a ceramic honeycomb body monolith, starting with a blank of the honeycomb body monolith with the bilaterally open ducts. An image-recording and processing system scans the end faces of the monolith and determines the deviations of the actual geometry of the ducts to be alternatingly sealed from the geometry of an idealized honeycomb body. The image-processing system determines zones on the respective end face of the monolith which correspond, within predeterminable tolerances, to the geometry of the idealized honeycomb body, wherein zones are determined having a maximally high number of ducts. In correspondence with the determination of the aforementioned zones, a processing route is established which predetermines which one of several metering heads with a varying number of nozzles will be activated. The nozzles then inject a plugging compound into the thus-determined ducts. After sealing of the determined ducts on one end face, the monolith is turned by 180° in a clamping and turning device whereupon the ducts on the second end face are sealed in a corresponding fashion, but in a pattern complementary to that on the first end face. The thus-prepared monolith is thereafter subjected to a ceramic-production process.

4 Claims, 4 Drawing Sheets

APPARATUS FOR PRODUCING A FILTER IN THE FORM OF A MONOLITHIC HONEYCOMB BODY

The present invention is a divisional application of U.S. patent application Ser. No. 08/046,865, filed Apr. 8, 1993, now U.S. Pat. No. 5,364,573.

BACKGROUND OF THE INVENTION

The invention relates to apparatus for the production of a filter in the form of a ceramic honeycomb body monolith, namely starting from a blank of the honeycomb body monolith.

Such filters have found increasing usage, for example, as diesel soot filters during the course of public concerns regarding the environment in passenger automobiles, trucks, and buses propelled by means of a diesel engine.

The effect of such a filter is based on the feature that the ducts of the honeycomb-shaped monolith are sealed alternatingly on both sides in such a way that the exhaust gas is forced to flow through the porous walls between the ducts. In this connection, the walls serve as the actual filters for the soot, which latter occurs in particles, or - depending on the particular usage - for the material to be removed by filtration. The ducts will, of course, be clogged with soot or the like after some time; as a consequence, such a filter must be regenerated from time to time, i.e. normally heated, so that the retained particles are oxidized.

The blanks for the honeycomb bodies frequently consist of sintered glass-ceramic monoliths made available in most cases by an extrusion process with subsequent drying and sintering. The body shrinks on account of drying and sintering, this shrinkage being nonuniform. This nonuniform shrinkage results in an incalculable deviation of the actual geometry from the desired geometry of an idealized honeycomb body. Additionally, the extrusion process leads to warpage of the honeycomb structure.

The aforementioned deviations, then, exert a considerable influence on the further processing of the honeycomb body monolith, namely in case the objective resides in alternatingly sealing the ducts on both end faces.

The entire significance of the concomitant problem of large-scale industrial manufacture becomes clear considering a standard monolith with a diameter of 5.66" (14.4 cm). The rough size of the honeycomb amounts to about 3.6×3.6 mm so that there are about 1,400 honeycomb ducts per end face with a hole cross section of respectively 2.4×2.4 mm. Therefore, approximately 700 honeycomb openings, and thus filter ducts, must be sealed on each end face alternatingly. Based on the aforementioned deviations from the desired geometry of the monolith, it is impossible in this instance to seal the 700 openings per end face with a nozzle head with 700 nozzles all at once in one working step. Also sealing of each second duct with the so-called plugging compound manually is not feasible in view of the high labor costs arising.

Devices and methods for the alternating sealing of the honeycomb ducts of a honeycomb body monolith have been proposed in the state of the art. Attention is invited, for example, to the very illustrative U.S. Pat. No. 4,411,856, incorporated herein by reference. This reference suggests the use of a mask completely covering one end face of the monolith, this mask being provided with passages and with peg-like extensions on the side facing the monolith. The pegs are inserted in the ducts not to be sealed whereas the plugging compound is introduced through the passages in the mask into the end zones of the ducts to be sealed. An attempt is made to consider the above-mentioned deviation of the monolith from an idealized desired geometry by providing that the mask utilized consists of an elastic material. This method may be usable within narrow limits. However, there is the problem that the spacing of the aforementioned pegs with respect to the passages is fixed so that the compensation of the deviations of the monolith from the desired geometry, obtained by the elasticity of the mask, remains restricted to relatively low values.

SUMMARY OF THE INVENTION

It is an object of the present invention to provide, based on the aforedescribed background an apparatus for performing, a process for the production of a filter in the form of a ceramic honeycomb body monolith wherein, starting with a blank of the monolith, the ducts on the end faces are alternatingly sealed with a plugging compound on a large industrial scale.

According to the process, it is suggested to determine zones of ducts on both end faces corresponding in predeterminable tolerances to the desired geometry of an idealized honeycomb body, wherein the zones are to contain a maximally high number of ducts. The zones correspond with metering heads of a metering device. The metering heads with varying numbers of nozzles are lowered into the ducts to be sealed and feed the viscous plugging compound into the end region thereof. The metering heads are moved and controlled by motor means in such a way that, in correspondence with the aforementioned determination of zones of ducts, the metering head having the highest number of nozzles is deployed with maximum frequency. Once all of these zones have been processed, the metering head having the next-lower number of nozzles is utilized. This is continued until all provided ducts have been sealed, which can also mean that individual ducts will be covered by a metering head having merely a single nozzle. The thus-prepared honeycomb body monolith is subsequently subjected to a ceramic-producing process wherein the honeycomb body shrinks once again. With a suitable choice of material for the plugging compound, the latter will shrink less than the material of the honeycomb body so that a firm seating of the plug in the end regions of the ducts is ensured.

In a preferred way, the first end face is initially scanned by an image recorder, for example a television camera, and the scanned image is stored in a memory of a computer.

The computer searches the image with regard to coherent zones of ducts corresponding, within predeterminable tolerances, to the desired geometry of corresponding zones of an idealized honeycomb body monolith. This search of coherent zones takes place under the auspices of a program. Thereafter, the processing route is determined for the metering heads controlled by the computer. This is done in accordance with this invention pursuant to the proviso that, if at all possible, the metering head having the greatest number of nozzles will be utilized most frequently. Thereby - as can readily be seen - the time for sealing the ducts is optimized, i.e. minimized, namely by simultaneously sealing a maximum number of ducts. In the residual zones, for example at the rim of the monolith, zones will remain with now only a few ducts to be sealed; for these, a metering head will then be used having a smaller number of nozzles, for example two or four.

In correspondence with the fixed processing route, the nozzles of the respective metering heads are lowered into the ducts to be sealed, and the viscous plugging compound is introduced into the end regions of the ducts whereupon the nozzles are again moved out of the ducts.

After one end face of the monolith has been treated in this way, and correspondingly all of the provided ducts have been sealed with the plugging compound, the monolith is turned by 180°. The ducts are sealed on the other end face in a corresponding fashion, but in a pattern complementary to that on the first end face. Only by this feature, after all, will the monolith become a filter.

Advantageously, the contours of the determined zones of ducts form a rectangle. This procedure corresponds with a complementary design of the metering heads wherein the nozzles are arranged in a rectangular matrix.

The apparatus according to this invention for conducting the process exhibits the following components:

(a) A mechanical moving unit which can travel in the three dimensional axes, such as a slide means, comprising a clamping and turning device which latter can be swung in motorized fashion about its vertical axis by means of a swiveling device. The honeycomb body monolith can be clamped into the clamping and turning device to be pivotable about the horizontal axis.

(b) An image recorder, such as, for example, a television camera, arranged above one end face of the monolith clamped in place in the clamping and turning device, this image recorder scanning the end face of the monolith and feeding the image information to a computer, the latter storing this information in its memory.

(c) At least two metering heads with a respectively differing number of nozzles, connected by way of colts with a metering installation for the viscous plugging compound, the monolith being movable toward these metering heads by activation of the slide means as well as the clamping and turning device, in accordance with the previously performed determination of the processing route by the computer for introducing the plugging compound into the end regions of the ducts of the monolith.

Preferably, the metering heads and the image recorder are rigidly supported in a frame, namely above the monolith retained in the clamping and turning device, wherein one of the end faces of the monolith, to be processed, faces the image recorder and the metering heads. In a computer-controlled fashion, the monolith is then moved by way of the slide means toward the respective metering head in correspondence with the fixedly determined processing route, whereupon the nozzles of this head are introduced into the ducts in the monolith to be sealed respectively during an operating cycle; for this purpose, the slide means executes a corresponding stroke motion. After attaining this position of the monolith, the computer causes the metering facility to force plugging compound via the corresponding conduits into the respective nozzles and to inject this compound into the end regions of the respective ducts. Preferably, the monolith is moved away in the downward direction during the injecting step corresponding to the injection speed and the amount injected, so that sealing of the ducts with the plugging compound terminates flush with the end face of the monolith. If the computer has determined a further zone on the end face which can be moved to the same metering head, then the slide means moves the monolith by the corresponding distance whereupon the procedure is repeated. If no other zone has been determined which can be processed with the same metering head, based on more extensive deviations from the desired geometry of an idealized honeycomb body monolith, then the slide means will move the clamped monolith to another selected metering head having a smaller number of nozzles where the sealing process is performed correspondingly.

After sealing all of the ducts to be covered on the first end face, the clamping and turning device will turn the monolith by 180°. The device then treats the second end face in a corresponding way as the first end face, but with the sealing pattern being complementary to that on the first end face so that the filter ducts are formed. Generation of the complementary sealing pattern on the second end face of the monolith causes no problems since the sealing pattern of the first end face is stored in the memory of the computer. The production of the complementary pattern thus is a task easily accomplished by the computer software.

Preferably, the nozzles of the metering heads are arranged in a rectangular total arrangement in each case in diagonal opposition. This design corresponds with the preferred feature of the process according to which the contours of the determined zones of ducts form a rectangle.

The process of this invention as well as the apparatus fulfill the requirements of mass production in an excellent way. Thus, the ducts of a reference monolith having the dimensions set forth in the foregoing and the above-mentioned number of ducts can be alternatingly sealed within about 15 minutes.

The thus-prepared monolith is then subjected to a conventional ceramic-producing process.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

The same reference numerals denote identical parts in the description set out below.

DETAILED DESCRIPTION

The honeycomb body monolith 1 exhibits a plurality of ducts 6 separated from one another by the duct walls 7. These duct walls 7 are porous and, after the alternating sealing of the ducts 6 on both end faces of the monolith 1, exert the filtering function proper, namely in that particles are retained by the walls 7 whereas exhaust gases can pass through the walls into the neighboring ducts which are not sealed on the other end face, for which reason the exhaust gases can be discharged therefrom. The outer wall 8 of the monolith is otherwise impermeable to exhaust gas.

Figure 1:
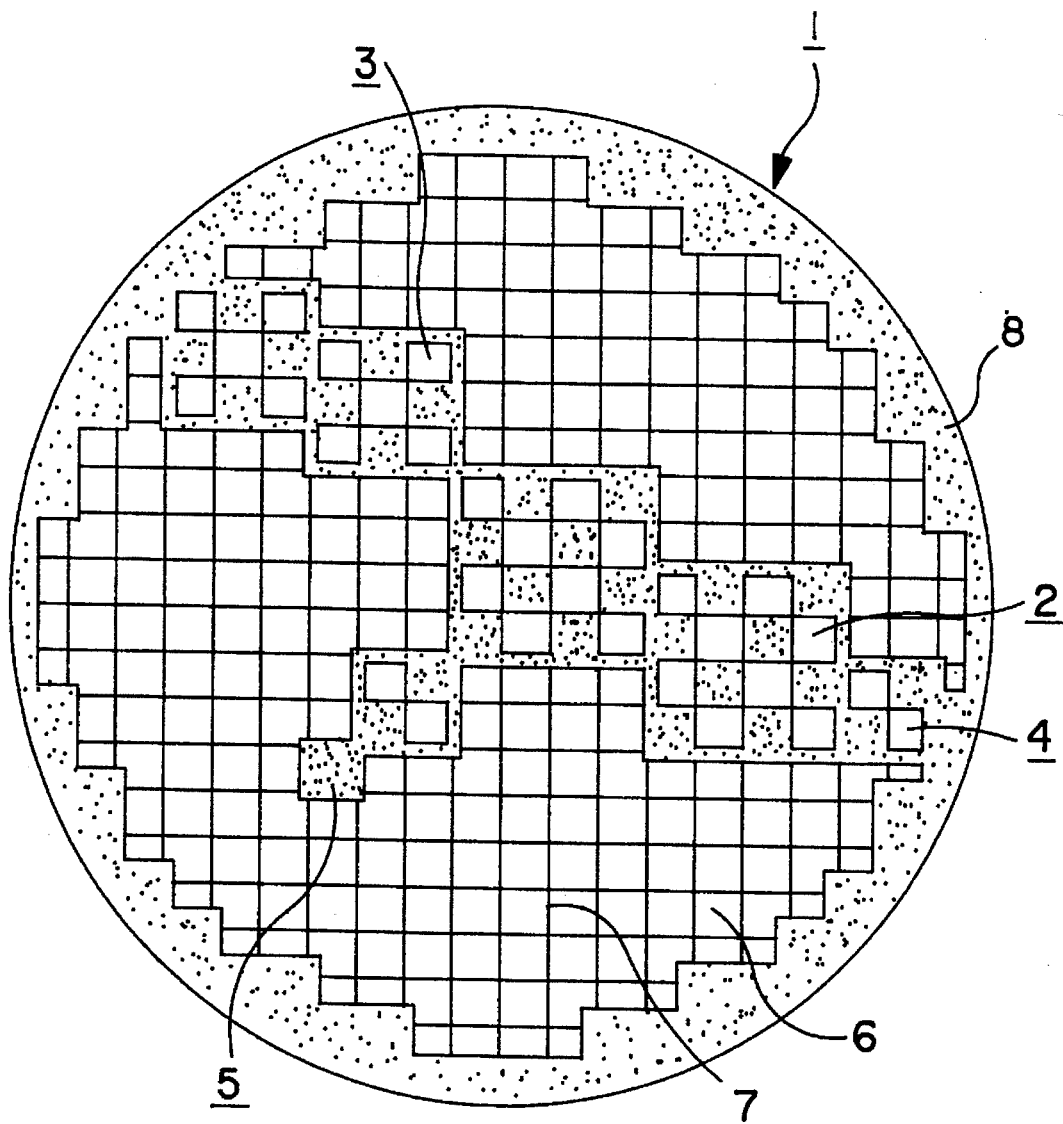
FIG. 1 shows a schematic top view of an end face of a monolithic honeycomb body with zones of ducts of varying size shown schematically.

The geometry of the monolith illustrated in FIG. 1 is idealized. In reality, not inconsiderable deviations occur from this desired geometry as a consequence of differing shrinkage during drying and sintering of the monolith, as well as due to the warpage of the honeycomb structure during extrusion.

As shown in FIG. 1, zones 2, 3, 4 and 5 are illustrated in schematized fashion; these are to represent zones of ducts 6 corresponding within predeterminable tolerances to the desired geometry of an idealized monolithic honeycomb body. The aforementioned zones are rectangular in that they are of a square shape in the illustrated embodiment. The fields left light within the zones point to those ducts that were left vacant while performing the process whereas the blackened areas are located on those ducts 6 that are to be sealed. The blackened locations then are likewise the positions where an associated metering head has the nozzles by means of which the plugging compound is injected into the respective ducts. Thus, the zone 2 extends over 16 ducts in total, 8 of which are to be sealed. The corresponding proportion in zone 3 is 9:4, in zone 4, 4:2. Zone 5 represents merely a single duct 6. In this case, the respective duct must be sealed by a metering head having only one nozzle since the geometrical deviations are so large that no other metering head with several nozzles can be utilized.

According to the process of this invention, one end face of the monolith 1 is scanned, and the image information is stored in a computer memory of a computer 30. Then, the centers of the ducts are determined in a program-controlled fashion. The software of the computer now places, so to speak, the grid of the zones 2 through 5 over the stored image information, an attempt being made for the sake of optimizing of being able to use the largest zone 2 with the greatest frequency. If this cannot be done, then smaller zones are laid over the image information in the computer memory until finally all of the ducts are classified, in software fashion, into zone areas. From this, the computer then calculates a processing route which determines which metering heads in which sequence are to be approached by the monolith 1. Starting with the largest zone 2, the monolith 1 is thus moved, for example, first of all to the metering head having the largest number of nozzles, arranged in the same pattern as the zone 2. In the hoped-for case that still more zones having this size have been found, the monolith will be moved correspondingly and is again, or repeatedly, moved at various locations toward the largest metering head. Thereafter, the next-smaller determined zones of the monolith are, for example, moved toward the next-smaller metering head until finally ducts can remain requiring a separate treatment by a metering head with only one nozzle.

After this process has been performed, the ducts 6 of the monolith 1 are sealed on one of its end faces. The monolith is then turned by 180° and the procedure is carried out correspondingly, but maintaining a complementary sealing pattern for the ducts.

After the controlled sealing of the ducts 6 on both end faces of the monolith 1, the latter is subjected to a customary ceramic-producing process, the finished filter being available at its termination.

Figure 2:
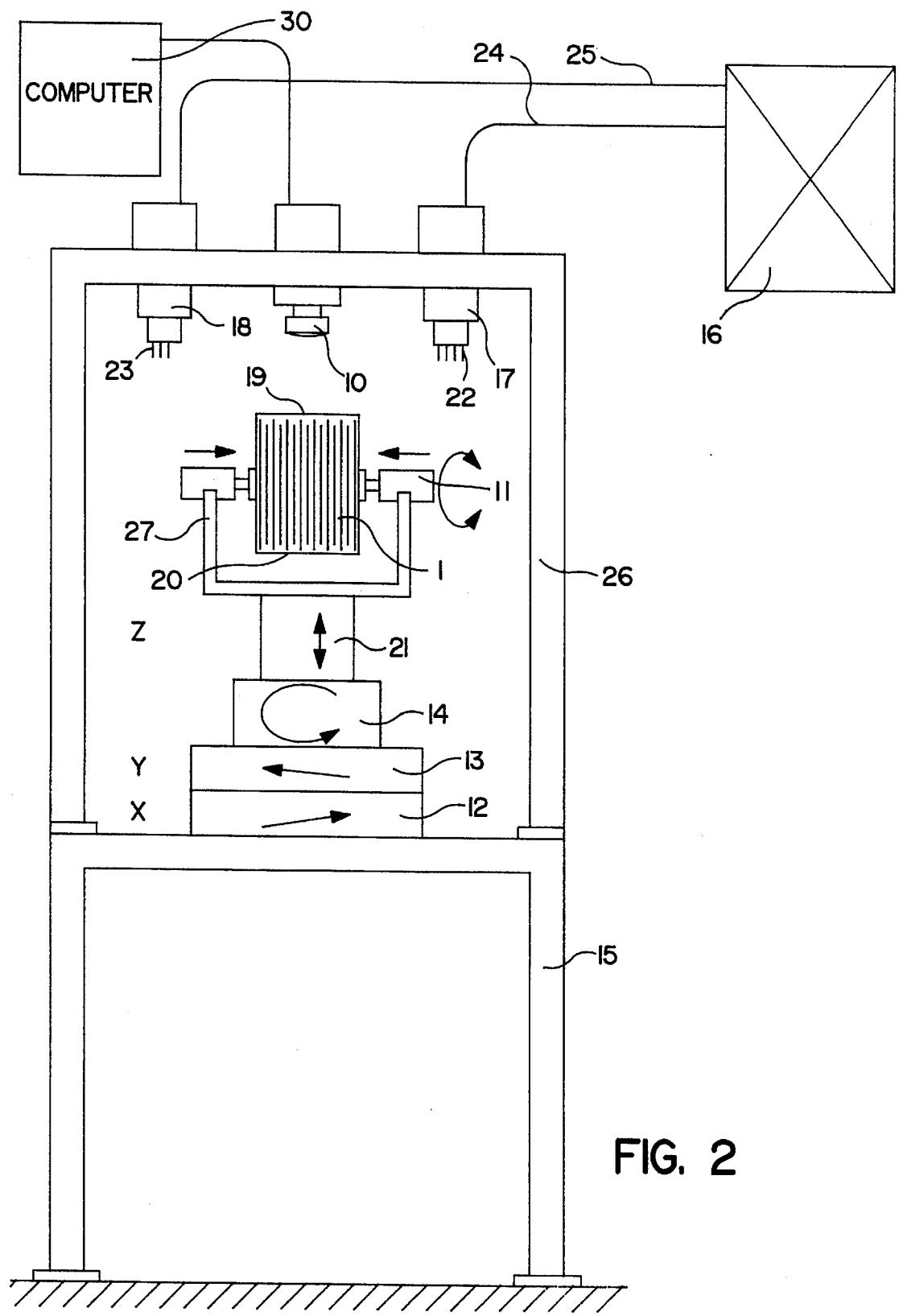
FIG. 2 shows an illustration, in principle of the apparatus according to this invention.
Figure 3:
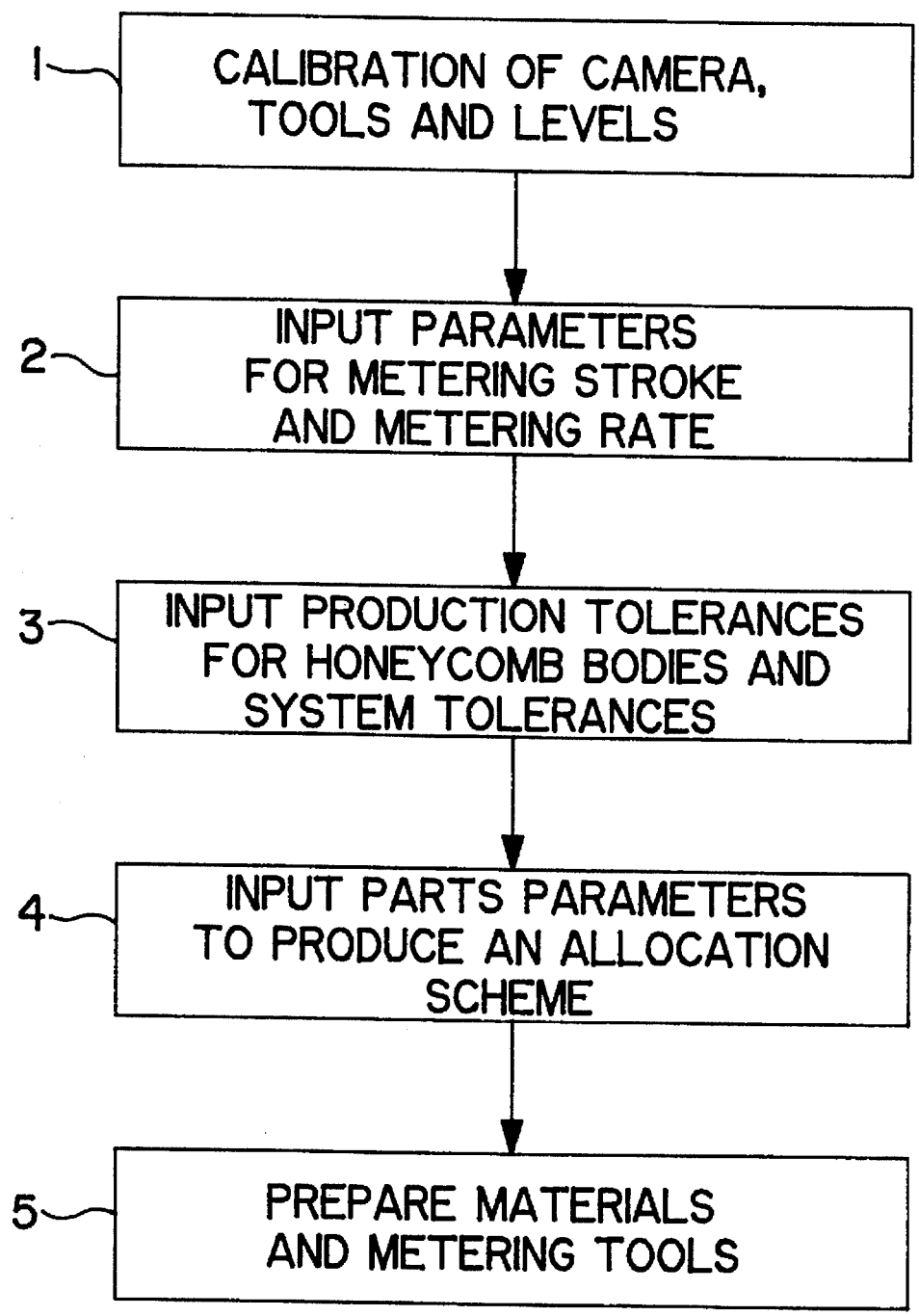
FIGS. 3 and 4 are flow charts sequencing steps followed in accordance with the principles of the instant invention.
Figure 4:
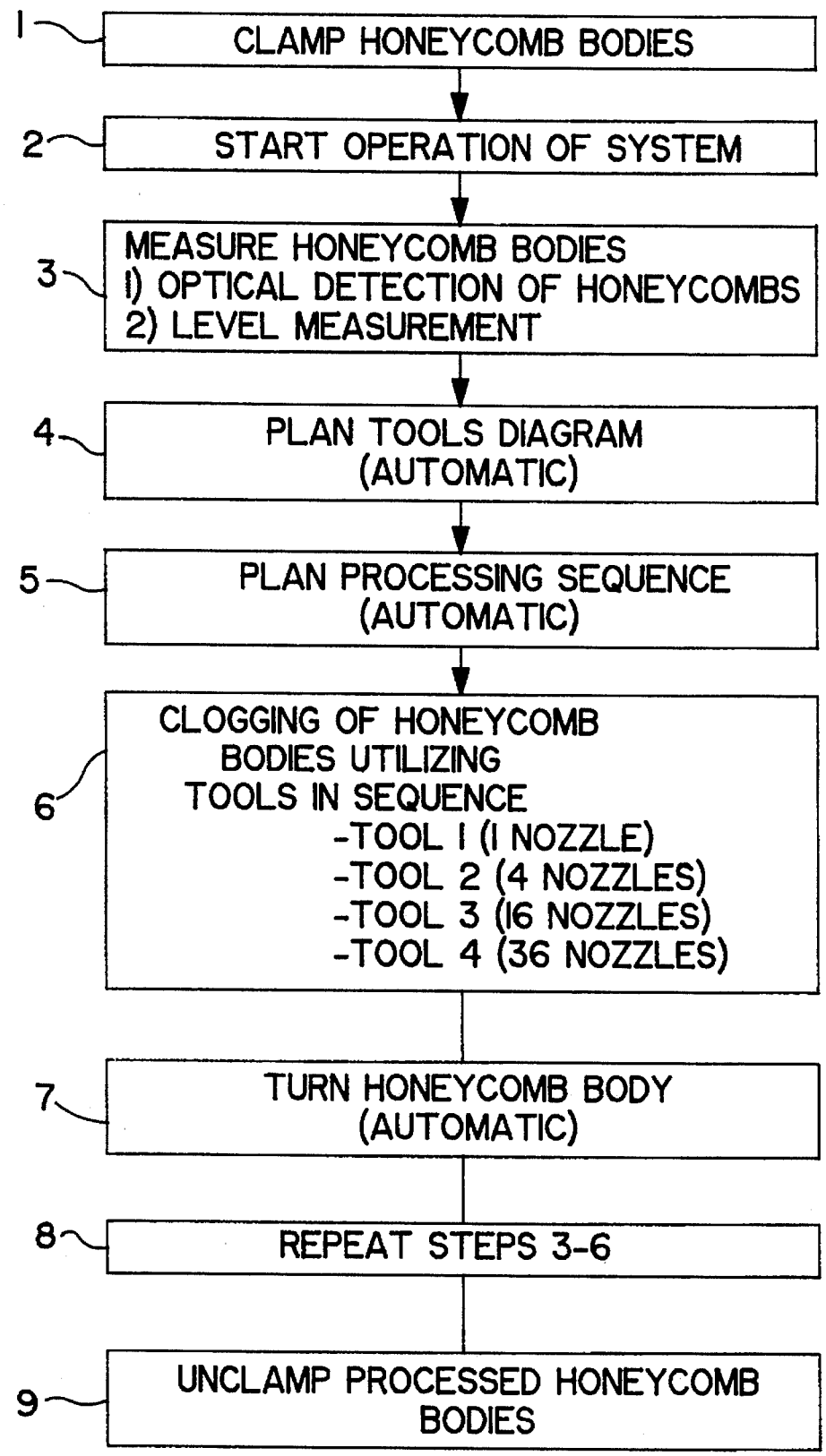

The apparatus for performing the process is illustrated in schematized fashion in FIG. 2.

A base frame or stand 15 carries a motor-driven slide means 12, 13 and 21, a swiveling device 14 being connected furthermore between these components. The slide means permits movement in all three dimensional axes of a bracket 27 carried by the slide means, a clamping and turning device 11 being mounted to the bracket. This clamping and turning device 11 retains between its jaws a monolithic honeycomb body 1, the two end faces 19 and 20 of which are to be treated in the manner described above. The slide means 12, 13 and 21, as well as the swiveling device 14 and the clamping and turning device 11 are actuated by a computer (not illustrated) in coincidence with the processing route determined by the computer.

The base stand 15 moreover supports a frame 26 extending over the slide means as well as the clamping and turning device. Above the monolith 1, a camera 10 as the image recorder is fixedly countersunk into the frame 26. The primary axis of the camera 10 is aligned with the primary axis of the monolith 1. Moreover, FIG. 2 shows two metering heads 17 and 18 likewise fixedly countersunk into the frame 26. These heads are connected via conduits 24 and 25 with a metering facility 16 and are fed, in computer-controlled fashion, with the viscous plugging compound contained in the metering facility 16.

The metering heads exhibit varying numbers of nozzles 22 and 23. In correspondence with the result of image processing, the metering heads 17 and 18 are approached by the slide means, and the monolith 1 is moved by the slide means 21 toward the respective metering head which latter then injects the plugging compound into the predetermined ducts 6 in the monolith 1.

While the process of this invention is preferably performed under computer control, the steps of manipulating the apparatus could be performed manually. Manual operation would, however, take much more time and perhaps require a highly skilled operator.

From the foregoing description, one skilled in the art can easily ascertain the essential characteristics of this invention, and without departing from the spirit and scope thereof, can make various changes and modifications of the invention to adapt it to various usages and conditions.

I claim:

1. An apparatus for selectively charging channels of a honeycomb filter with a plugging compound, the apparatus comprising:

a slide means movable in a motorized fashion in three orthogonal axes, the slide means comprising a clamping and turning device swivelable in motorized fashion by a swiveling device about a vertical axis, a honeycomb filter being fixable by clamping in the clamping and turning device to be pivotable about a horizontal axis intersecting the vertical axis, an image recorder connected to a computer and arranged above the clamping and turning device to scan a first end face of the honeycomb filter clamped into the clamping and turning device, and to feed image information to a computer memory of the computer, at least two metering heads with a respectively differing number of nozzles connected via conduits with a metering facility containing the viscous plugging compound, the filter being movable toward the metering heads by activation of the slide means as well as of the clamping and turning device in accordance with a determination of a processing route by the computer, for introducing the plugging compound into end regions of ducts of the filter.

2. The apparatus according to claim 1, wherein the metering heads and the image recorder are located and rigidly supported in a frame positioned above the filter which is retained in the clamping and turning device.

3. The apparatus according to claim 2, wherein the nozzles of the metering heads are arranged in a square total pattern.

4. The apparatus according to claim 1, wherein the nozzles of the metering heads are arranged in a rectangular pattern.

* * * * *